(12) United States Patent
Darvish et al.

(10) Patent No.: US 7,650,300 B2
(45) Date of Patent: Jan. 19, 2010

(54) SYSTEM FOR MANAGING GAS EXPENDITURES

(76) Inventors: John R. Darvish, 8408 Rapley Ridge La., Potomac, MD (US) 20854;
Jamshyd Darvish, 3150 South St. NW. #PH2D, Washington, DC (US) 20007

( * ) Notice: Subject to any disclaimer, the term of this patent is extended or adjusted under 35 U.S.C. 154(b) by 8 days.

(21) Appl. No.: 11/906,677

(22) Filed: Oct. 3, 2007

(65) Prior Publication Data
US 2008/0133386 A1    Jun. 5, 2008

Related U.S. Application Data

(60) Provisional application No. 60/849,142, filed on Oct. 3, 2006.

(51) Int. Cl.
*G07B 17/00*    (2006.01)
*G07G 1/00*    (2006.01)
*G07F 19/00*    (2006.01)
*G06Q 40/00*    (2006.01)

(52) U.S. Cl. .............................. 705/30; 705/14; 705/33; 705/40

(58) Field of Classification Search ................... 429/12; 705/14, 30
See application file for complete search history.

(56) References Cited

U.S. PATENT DOCUMENTS 6,673,479 B2 * 1/2004 McArthur et al. ............ 429/12
6,741,968 B2 * 5/2004 Jacoves et al. ............... 705/14

\* cited by examiner

*Primary Examiner*—Matthew Gart
*Assistant Examiner*—Talia Crawley
(74) *Attorney, Agent, or Firm*—Ober/Kaler; Royal W. Craig

(57) ABSTRACT

The present invention is a system for providing businesses with comprehensive gas book management capabilities, inclusive of a process for authorizing and tracking gas book expenditures, as well as software for accounting, reconciling and reporting. An overseer runs the software and enters pertinent Request data into a database. The software prints two hard copies of the gas Purchase Order each bearing a unique auto-generated Purchase Order number. One copy is given to the requestor, and one is filed. When purchasing gas, the Requestor exchanges their Purchase Order with a receipt for gas. The requestor returns this receipt to the overseer, who enters pertinent Receipt data into the database. This allows the business to periodically reconcile the database against charge statements received from credit card issuers or gas stations, better manage gas usage, and identify fraud, excessive gas spending, and charge mistakes.

10 Claims, 20 Drawing Sheets

GAS Voucher Request Form
This Voucher Not Valid For Gasoline

DATE: _____

REQUESTED BY: _____

CUSTOMER NAME: _____

REASON FOR GAS: _____

STOCK # / RO #: _____

AMOUNT: $ _____

AUTHORIZED BY: _____
DEPARTMENT:        *Not Valid For Gasoline*

| Toyota | New Sales | Used Sales |
| Nissan | Service | Parts |
| Volvo | Rental / Loaner | |

FIG. 1 (Prior Art)

 
GAS Voucher Request Form
This Voucher Not Valid For Gasoline
DATE: _____
REQUESTED BY: _____
CUSTOMER NAME: _____
REASON FOR GAS: _____
STOCK # / RO #: _____
AMOUNT: $ _____
DEPARTMENT: _____
AUTHORIZED BY: _____
Not Valid For Gasoline
FIG. 3

FIG. 7

Gas Purchase Order

ABC Motors
123 Main St
Dallas, TX 75038
(972) 555-1212
www.ABCmotors.com

| P.O. Number | 001003 | Stock/ RO# | 97856A |
|---|---|---|---|
| Gas Requested By | Joe Requestor | Reason | DEMO RIDE - CUSTOMER |
| Customer Last Name | Smith | Issued By | Valene Gitelson |
| Department | New Cars | Issued | 4/1/2007 18:09 |

Max Gasoline Amount   $10.00    Not Valid Unless Signed By Authorizing Manager

Authorizing Manager
_____
Adam Approver

Printed      4/1/2007 6:09 PM

Comments     Free space to enter comments about the gas PO

| 6-MONTH PO HISTORY FOR THIS VEHICLE |||||
|---|---|---|---|---|
| Date | PO Number | Auth Amount | Gallons | Total |
| 12/17/06 | 0095621 | FILL-UP | 12.259 | $30.64 |
| 02/22/07 | 0097548 | $10.00 | 3.879 | $9.69 |
| 02/28/07 | 0097783 | $12.00 | PO IN VOID STATUS | |
| 04/01/07 | 0001001 | $20.00 | PO IN VOID STATUS | |

- - - - - - - - - - - - - - - - - - - - - - - - - - - - - - - - - - - - - - - - - -

ABC Motors

Control Copy

| P.O. Number | 001003 | Stock/ RO# | 97856A |
|---|---|---|---|
| Gas Requested By | Joe Requestor | Reason | DEMO RIDE - CUSTOMER |
| Customer Last Name | Smith | Issued By | Valene Gitelson |
| Department | New Cars | Issued | 4/1/2007 18:09 |

| | | | |
|---|---|---|---|
| Max Gasoline Amount | $10.00 | Comments | Free space to enter comments about the gas PO |
| Authorized by | Adam Approver | | |

GAS
*Gasoline Approval System*

Purchase Orders | Administration | Reports | Resources eDealership

Displaying 1 to 1 of 1 records that match your criteria.

Return to Search

Number of Records per Page 25

| | | P.O. # | Stock # | Issue Date | Issue Time | Issue by | Requested by | Reason | Requested Amount | Status |
|---|---|---|---|---|---|---|---|---|---|---|
| close | edit  void | 021232 | 444082 | 3/16/2007 | 9:34 AM | SHANA BUDD | ROBERTO CEICEDO/PAUL.STPAUL | TRANSPORT VEHICLE | Fill Up | |

FIG. 10

GAS
*Gasoline Approval System* eDealership

| Purchase Orders | Administration | Reports | Resources |

Return to Search Results

P.O. #
021232

Reason
TRANSPORT VEHICLE

Issue Date
3/16/2007

Stock/ RO#
444082

Issued Time
9:34 AM

Authorized by
Roberto Caicedo

Issued by
SHANA BUDD

Department
Nissan - Service

Requested by
ROBERTO CEICEDO/PAUL STPAUL

Amount Authorized
Fill Up

Customer Last Name
NISSAN SHUTTLE

Comments

Gas Station Receipt #* of Gallons Used*

Price per Gallon*

Total Charge*

Calculated Total

Closing Notes

| cancel | save closing notes | close out |

FIG. 11

(Reserved)

FIG. 12

GAS
*Gasoline Approval System*

| Purchase Orders | Administration | Reports | Resources | eDealership |
|---|---|---|---|---|

Displaying 1 to 3 of 3 records that match your criteria.
Return to Search

[cancel] [save]    □ Set All [--Select--▼]    Change Authorized by [Lisa Eney ▼]

| P.O. # | Department | Stock # | Issue Date | Issue Time | Issue by | Requested by | Reason | Requested Amount | Status |
|---|---|---|---|---|---|---|---|---|---|
| GG001002 | Sales ▼ | LKUDG0087G908F798 | 2/1/2007 | 1:17 PM | G1440User User | Eney | DEMO RIDE - CUSTOMER | Fill Up | |
| GG001005 | Sales ▼ | D76V89HFG9H68VF9B | 2/1/2007 | 1:31 PM | G1440User User | Eney | SERVICE - VEHICLE IN SERVICE | $25.00 | |
| GG001006 | Sales ▼ | G879087D0G9S87GD9 | 2/1/2007 | 2:24 PM | G1440Company Admin | Eney | SOLD CAR - DELIVERY | Fill Up | |

[cancel] [save]

FIG. 14

GAS
*Gasoline Approval System*

| Purchase Orders | Administration | > Reports | Resources | eDealership |

G1440 Motors
Unclosed Gas Vouchers

Gas Voucher(s) Created By:  G1440Company Admin

| PO | Issued Date | Department | Requested By | Authorized By |
|---|---|---|---|---|
| | Time | Stock # / Customer | Reason | Authorized Amount |
| GG001006 | 2/1/2007 | Sales | Eney | Lisa Eney |
| | 2:24 PM | G8790870D  LaCroix 0G9S87GD9 | SOLD CAR - DELIVERY | Fill up |

Unclosed Gas Vouchers

GAS
*Gasoline Approval System*     eDealership

Department Summary Report - G1440 Motors - 1/1/2007 - 3/19/2007

Department: Sales

Reason    RENTAL CAR FILL-UP

| Authorizing MGR | PO# | Requested By | Issued By | Date | Gallons |
|---|---|---|---|---|---|
| Lisa Eney | GG001004 | Eney | G1440User User | 2/1/2007 | 23.000 |
| Lisa Eney | GG001009 | Lisa | eDealership Admin | 2/27/2007 | 10.000 |

Reason    SOLD CAR - DELIVERY

| Authorizing MGR | PO# | Requested By | Issued By | Date | Gallons |
|---|---|---|---|---|---|
| Lisa Eney | GG001001 | Eney | G1440User User | 2/1/2007 | 15.235 |

Department Summary Report

GAS
*Gasoline Approval System* eDealership

G1440 Motors
Gasoline Expense Summary
From 1/1/2007 Thru 3/19/2007

| Department | Total | Percent | |
|---|---|---|---|
| Sales | $107.93 | 100.00 % | (3 Gas PO's) |
| Total Gasoline Expense | $107.93 | | (3 Gas PO's) |

There are 5 open Purchase Orders not included for this time period.

Of the 3 closed PO's in this report, 0 did not get posted and their total is $0.00.

3/19/2007 5:25:15 PM      Gasoline Expense Summary      Page 1 of 1

FIG. 19

| | System Administrator | Corporate Administrator | Area Administrator | Company Administrator | User (permissions granted by Company Adm...) |
|---|---|---|---|---|---|
| Manage Corporations | X | | | | |
| Manage Areas | X | | | | |
| Manage System Admins | X | | | | |
| Manage Corporate Admins | X | X | | | |
| Manage Area Admins | X | X | | | |
| Manage Company Admins | X | X | X | | |
| Manage Users | X | X | X | X | |
| Manage Company | X | X | X | X | |
| Manage Departments | X | X | X | X | |
| Manage Reasons for Gas Voucher | X | X | X | X | |
| Manager Approvers | X | X | X | X | |
| View Gas P.O. Search & Listing | X | X | X | X | |
| Create Gas P.O. Voucher | X | X | X | X | |
| Edit Gas PO Voucher | X | X | X | X | |
| Close Out P.O. | X | X | X | X | |
| Void P.O. | X | X | X | X | |
| Print Duplicate P.O. | X | X | X | X | |
| EOM Reports | X | X | X | X | |
| Voucher Status Reports | X | X | X | X | |
| Department Summary/Detail Reports | X | X | X | X | |
| Stock Number Audit Report | X | X | X | X | |
| Export Report | X | X | X | X | |
| Change PO Status | X | X | X | X | |

FIG. 20

SYSTEM FOR MANAGING GAS EXPENDITURES

CROSS-REFERENCE TO RELATED APPLICATIONS

The present application derives priority from U.S. provisional application No. 60/849,142 filed 3 Oct. 2006.

BACKGROUND OF THE INVENTION

1. Field of the Invention

The present invention relates to software-based accounting systems for automobile dealerships, rental car and other industries that regularly purchase gas for multiple vehicles as an operating expense ("fleet companies"). More particularly, the invention relates to a method and software solution for providing automobile dealerships and fleet companies with comprehensive management capabilities throughout the process of authorizing and accounting of gas book expenditures, as well as reconciliation and reporting of said expenditures to eliminate fraud and waste.

2. Description of the Background

High gas prices are having a negative effect on auto dealer profit margins in various ways. For example, many manufacturers no longer reimburse a dealership to deliver a new vehicle with a full tank of gasoline. Whether or not the dealer chooses to absorb this expense, their monthly gasoline costs are substantial. The dealer is still left to pay for gas for customer test drives, rental cars, service vehicles, to pick up or deliver parts, etc. Consequently, larger auto dealership groups are experiencing monthly gas expenses of hundreds of thousands of dollars. This is prompting dealerships to scrupulously guard this aspect of their overhead costs. Unfortunately, there are no established methods or tools to help cut this expense. Indeed, the traditional method of approving and accounting for gas expenses is archaic. The dealership will maintain a "gas book", e.g., a ledger book of gas expenditures. Whenever a salesman needs to put gas in a car to allow a customer to take a test drive, service personnel need to fill a test a car, runners need to run errands to the motor vehicle department or pick up/drop off parts, or any other employee needs gas for any reason, they are all required to complete a gas Purchase Order request form.

FIG. 1 is an example of a typical gas Purchase Order request form which includes the following fields

DATE:

REQUESTED BY:

CUSTOMER NAME: (the customer prompting the need for gas)

REASON FOR GAS: (test drive, road test, service, etc).

STOCK #/RO#: (the dealer number of the vehicle)

AMOUNT: (authorized amount of Purchase Order)

AUTHORIZED BY: (dealer manager signoff)

DEPARTMENT: (the department requesting the gas)

Larger dealers will also include check boxes to designate the division requesting the gas (Toyota New Sales, Used Sales, Nissan New Sales, Service, Parts, etc.).

The requester will obtain and complete this form, have it approved by a manager, take it to a gas station, and obtain the gas. At the gas station either the requester will use a dealership charge card or the gas station will maintain a running credit account for the dealership. After pumping the gas the requestor is issued a receipt at the gas station, then returns to the dealership and submits the Purchase Order together with the receipt. At the end of the month the dealership will be charged for the gas. Typically, the dealership receives a charge statement reflecting hundreds of such fill-ups, and there is no ready way to correlate the charge statements with the original gas Purchase Order requests and receipts. The disparate data is far too difficult to reconcile, and so typically it is not. The result is a total lack of oversight, and the situation is ripe for fraud. Unscrupulous sales and service personnel piggyback their cigarette and sundry purchases on the gas charge, have their friends meet them at the gas station for a free fill-up, and sometimes use the Purchase Order to fill their own personal car rather than the dealer's. Without any cognizant way of tracking and reconciling these purchases all such attempts at fraud simply fall through the cracks.

In light of the foregoing, it would be of great advantage to create a management system for automobile dealerships and fleet companies that gives far greater management control and accountability over gasoline expenditures, throughout the process of authorizing gas Purchase Orders, executing Purchase Orders, accounting for them and reconciling final charges, as well as reporting on the foregoing to eliminate discrepancies and fraud.

SUMMARY OF THE INVENTION

It is therefore an object of the present invention to provide a complete solution for automobile dealerships to give them comprehensive gas book management capabilities, inclusive of authorizing and tracking gas book expenditures, as well as accounting, reconciling and reporting on them.

It is another object to reduce fraud and charge mistakes associated with the typical dealership gas book.

It is another object to simplify gas book accounting, and provide a method of spotting excessive gas spending by any department or employee within a dealership.

These and other objects are accomplished by providing a process for authorizing and tracking gas book expenditures, plus supporting software for accounting, reconciling and reporting on them.

The business process for gas approval includes a critical workflow, and software integrated into the workflow that yields a robust gas book expenditure accounting function. The workflow generally includes the following steps:

1—Employee in need of gas (Requestor) fills out a Gas Request Voucher form and optionally obtains signature from authorized person on Gas Request Voucher form.

2—Requestor returns completed Gas Request Voucher form to staff (Overseer) who enters the request data into the software. The data captured includes requested by, date & time, customer's last name (if applicable), reason for getting gas, stock# of the vehicle, amount of gas needed (dollar amount or fill-up), department, person who authorized the request (if applicable) and comments. The system also logs the name of the Overseer (the person entering the data).

3—Overseer prints Requestor copy and Control copy of Purchase Order. The software auto-generates a unique Purchase Order number for each Purchase Order, and prints two hard copies of the gas Purchase Order each bearing the unique number. One of the Purchase Orders is the Requestor copy and one is a Control copy. If the dealership chooses to require manager approval, the Requestor copy must then be signed by authorized company personnel.

4—Control copy is filed in the office.

5—Employee (Requestor) goes to the gas station and presents the Requestor Purchase Order to the gas station attendant, gets the gas, and exchanges said Purchase Order for a gas station receipt.

6—Requestor Purchase Order number is written on the gas receipt by the gas station attendant, and then Requestor brings the receipt back to the office and turns in for entry into the software (this is called "Closing the PO").

7—Gas station keeps the Requestor Purchase Order until it is time for them to collect payment from the dealership (usually monthly), then they bring all the Requestor Purchase Order forms to the dealership for payment. These batch Requestor Purchase Orders are then used by the office to periodically "Reconcile" gas purchases to spot fraud, excessive gas spending, and charge mistakes.

A complete system inclusive of workflow, plus integrated software method and architecture are herein described.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 1 is an example of a "Prior Art" gas voucher.

FIG. 3 is a screen print of the Gas Voucher Request Form in accordance with the present invention.

FIG. 7 is a screen print of the Purchase Order Data Entry Screen.

FIG. 8 is the Gasoline Purchase Order (both Requestor Copy top and Control Copy bottom)

FIG. 9 is a screen print of the Search Screen.

FIG. 10 is a screen print of the Purchase Order Display Screen.

FIG. 11 is a screen print of the Purchase Order Closeout data entry screen.

FIG. 12 (Reserved)

FIG. 14 is a screen print of an exemplary Change Department Allocation screen.

FIG. 17 is a screen print of an exemplary Unclosed Purchase Order Report.

FIG. 18 is a screen print of an exemplary Department Summary Report.

FIG. 19 is a screen print of an exemplary End of Month Expense Summary Report.

FIG. 20 is a matrix of the assigned permissions (and corresponding editing/reporting capabilities allowed for each of these user groups.

DETAILED DESCRIPTION OF THE PREFERRED EMBODIMENTS

The present invention is a system inclusive of a method and implementing software for providing automobile dealerships and fleet businesses with comprehensive gas book management capabilities, inclusive of a process for authorizing and tracking gas book expenditures, as well as software for accounting, reconciling and reporting on them.

The software is preferably deployed on one or more web-enabled backend servers hosting a resident database and user interface in the form of a website that can be reached by dealerships at an appropriately named URL such as, for example, eDealership.com. The back-end web-enabled server(s), database and website are maintained by a third party application service provider ('ASP'), and all dealer-Manager communication may take place over the Internet.

The core method comprises a set procedure for dealership's to allow employees to obtain gas, and for the dealerships to account for this and reduce or eliminate fraud. The procedure requires participation by the employees as well as gas stations, and is implemented and coordinated by the web-based software to be described. The core method includes the following steps:

1st—Employee in need of gas ("Requestor") fills out a Gas Request Voucher form, optionally obtaining signature from authorized Manager on the Gas Request Voucher form.

2nd—Requestor returns completed Gas Request Voucher form to an assigned staff member (Overseer) who enters the form data into the software. The data captured includes requested by, date & time, customer's last name (if applicable), reason for getting gas, stock# of the vehicle, amount of gas needed (dollar amount or fill-up), department, manager who authorized the request (if applicable) and comments. The system also logs the name of the Overseer (who is entering the data).

3rd—Overseer prints Requestor copy and Control copy of Purchase Order. The software auto-generates a unique Purchase Order number for each Purchase Order, and prints two hard copies of the gas Purchase Order, a Requestor copy and a Control copy.

4th—Control copy is filed in the office.

5th—Employee (Requestor) goes to the gas station and presents the Requestor Purchase Order to the gas station attendant, gets the gas, and exchanges the Purchase Order for a gas station receipt.

$6^{th}$—Requestor Purchase Order number is written on the gas receipt, by the gas station attendant, which Requestor then brings back to the office and turns in for "Closing the PO".

7th—Meanwhile, the gas station keeps the Requestor Purchase Orders until it is time for them to collect payment from the dealership (usually monthly), then they bring all the Requestor Purchase Order forms to the dealership for payment. These batch Requestor Purchase Orders are used by the dealership to periodically "Reconcile" gas purchases and spot fraud, excessive gas spending, and charge mistakes.

Figure 2:
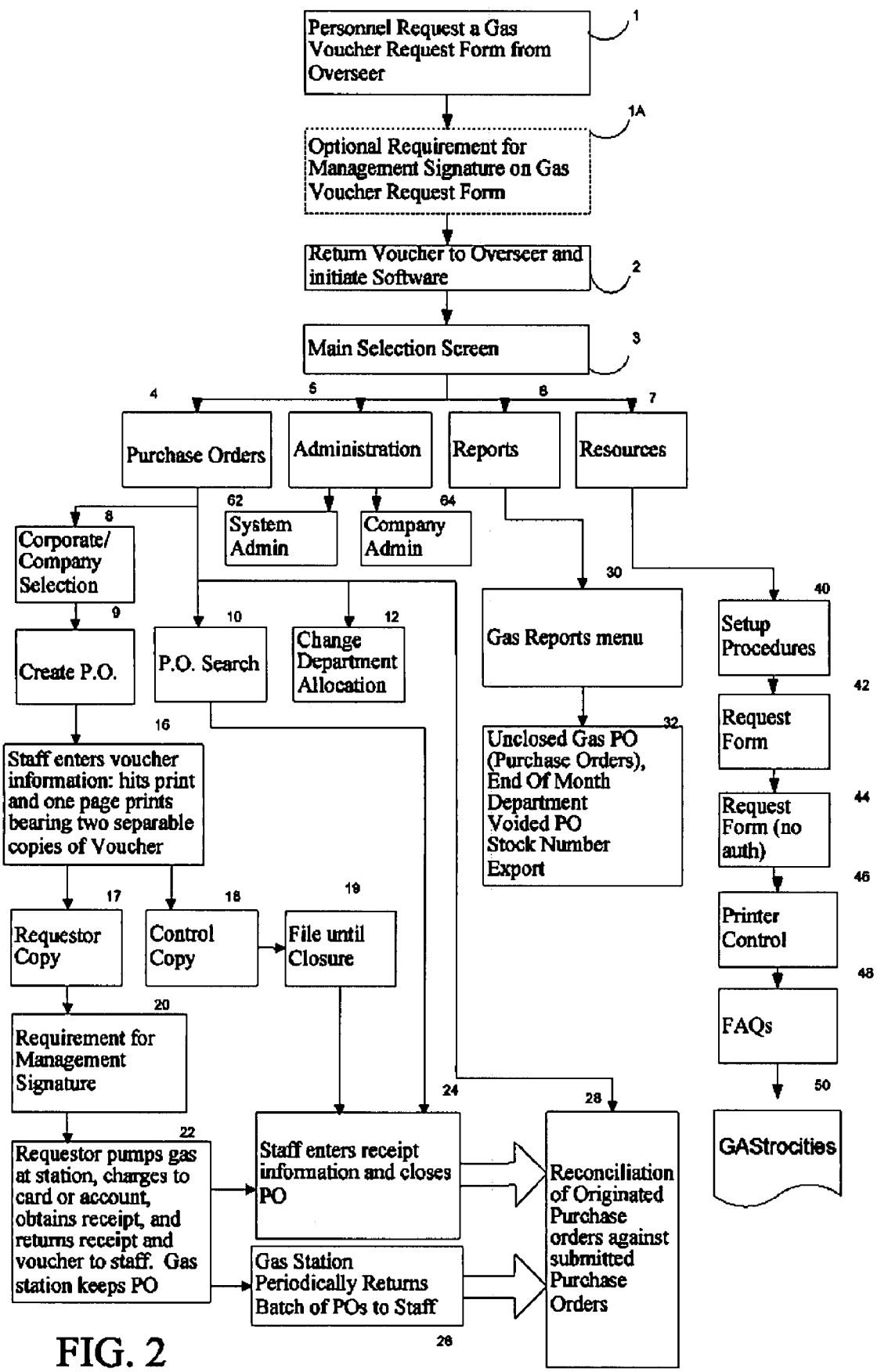
FIG. 2 is a top level flow diagram of the gas purchase approval and accounting system of the present invention.

FIG. 2 is a top level flow diagram of the gas purchase approval and accounting system of the present invention. In accordance with the process, a clerical staff member of the dealership is assigned to be the "Overseer" of the software with responsibilities for data entry, forms distribution, etc. The overseer enters the data via an internet-connected conventional PC computer, which accesses the hosted software via the home (eDealership.com) URL maintained by the ASP on back-end web-enabled server(s).

The process begins when any employee needs gas. At step 1, the employee obtains a "Gas Voucher Request Form" from the Overseer as shown in FIG. 3 and fills it in. The Gas Voucher Request Form is similar to that shown in FIG. 1 and includes the following fields

DATE:

REQUESTED BY:

CUSTOMER NAME: (the customer prompting the need for gas)

REASON FOR GAS: (test drive, road test, service, etc).

STOCK#/RO#: (the dealer number of the vehicle)

AMOUNT: (authorized amount of Purchase Order)

AUTHORIZED BY: (optional: dealer manager signoff)

DEPARTMENT: (the department requesting the gas)

The present software is capable of generating and printing these forms, and the Overseer can print these forms on demand or and distribute them, or can maintain a ready supply. The current embodiment of the system will print four forms per sheet as seen in FIG. 3, two forms per page with and two forms without the last "Authorized By" line.

At step 1A if the optional "manager approval" is required, the requesting employee must take the Gas Voucher Request Form and obtain an approval signature from an authorized manager. However, the software also allows the manager signoff feature to be enabled or disabled, in which case the AUTHORIZED BY: field is not included when the forms are printed. This feature can be activated or deactivated by an administrator of the system with supervisory rights. If the feature is deactivated this step 1A is unnecessary.

At step 2, the employee (now the "Requestor") gives the completed Gas Voucher Request Form back to the overseer, who initiates the present software and logs in (with secure password and username).

At step 3, the software initializes to a Main Selection Screen, which provides a graphical user interface, basic introduction and instructions, and access links to the main functional portions of the software.

Figure 4:
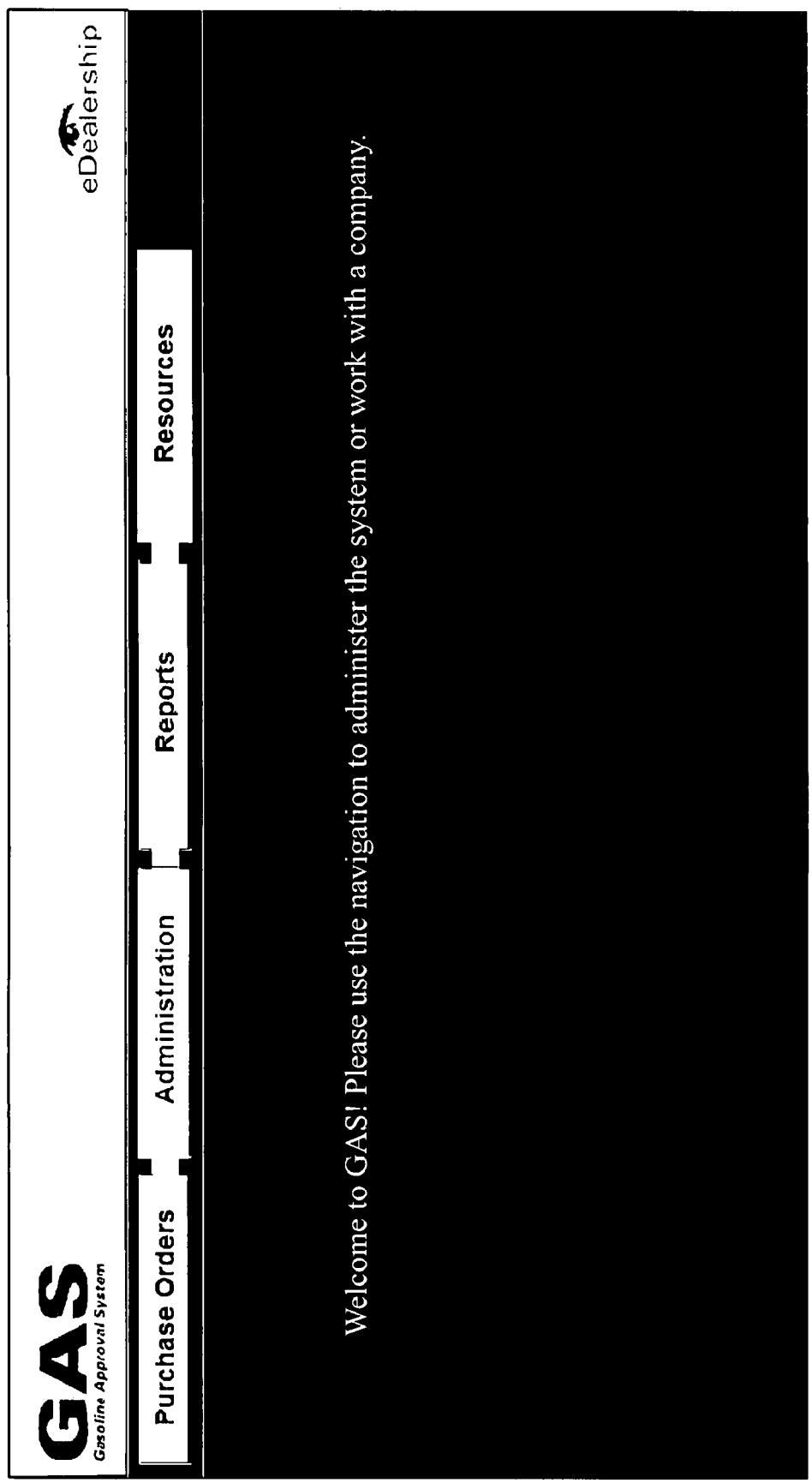
FIG. 4 is a screen print of the Main Selection Screen.

FIG. 4 is a screen print of the Main Selection Screen for the software of the present invention. The links are tabs at the top of the screen which include "Purchase Orders", "Administration", "Reports", and "Resources."

At step 4 the overseer depresses the Purchase Orders Tab at the top of the screen. Note that all dealership users (with or without administrative rights) are automatically logged directly into their company and dealership. However, the ASP users (Corporate Admins and Area Admins) must first select a particular company and dealership to work with in order to work with the corresponding purchase orders, reports, or company setup.

Figure 5:
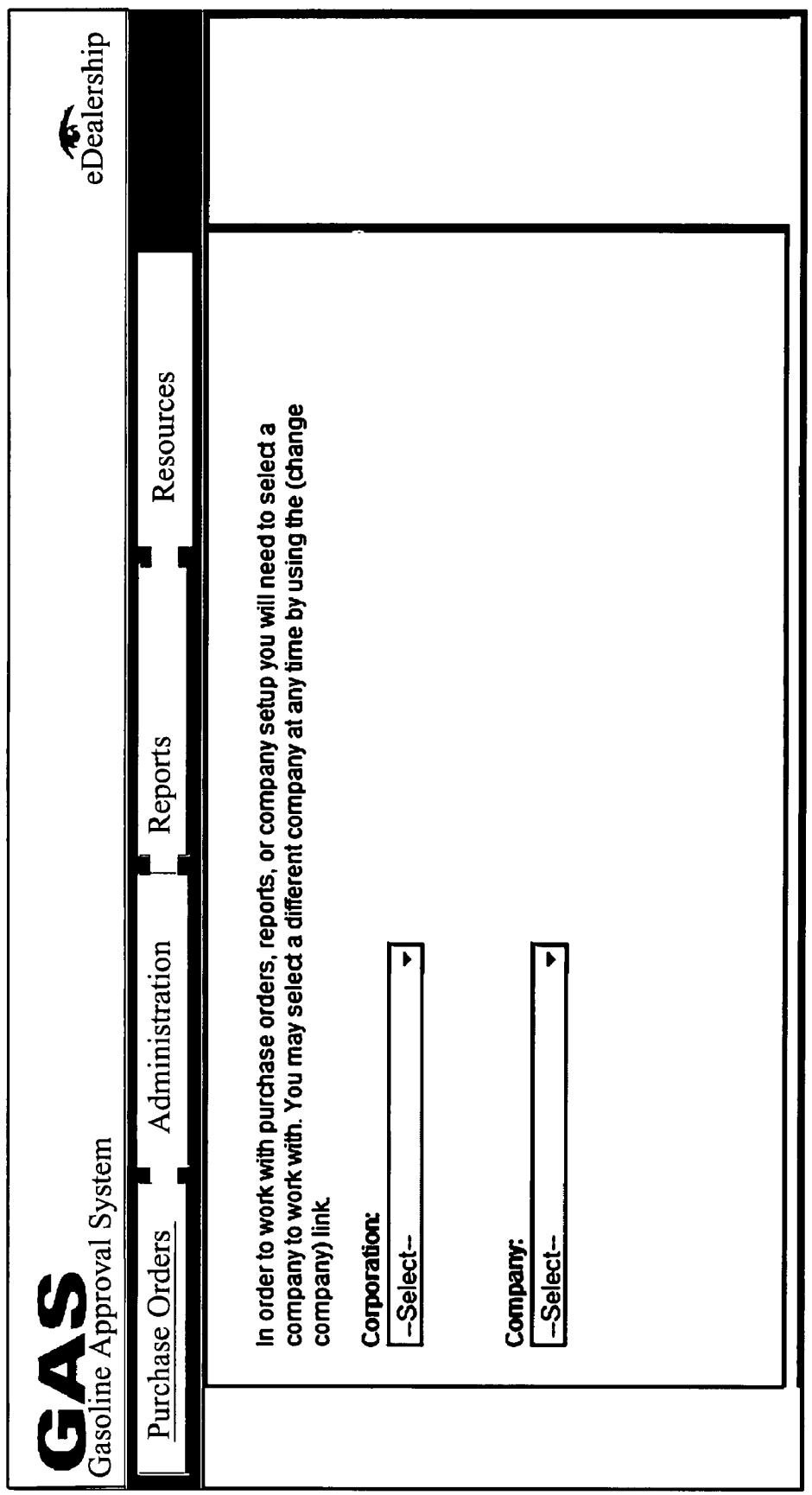
FIG. 5 is a screen print of the corporation and company selection screen.

FIG. 5 is a screen print of the corporation and company selection screen that includes a drop down selection menu of subscribed corporations and companies. For example, a subscribing parent corporation may have several dealerships, and the overseer must choose the appropriate parent and dealership. At step 8 the overseer makes their corporate/company selections.

Figure 6:
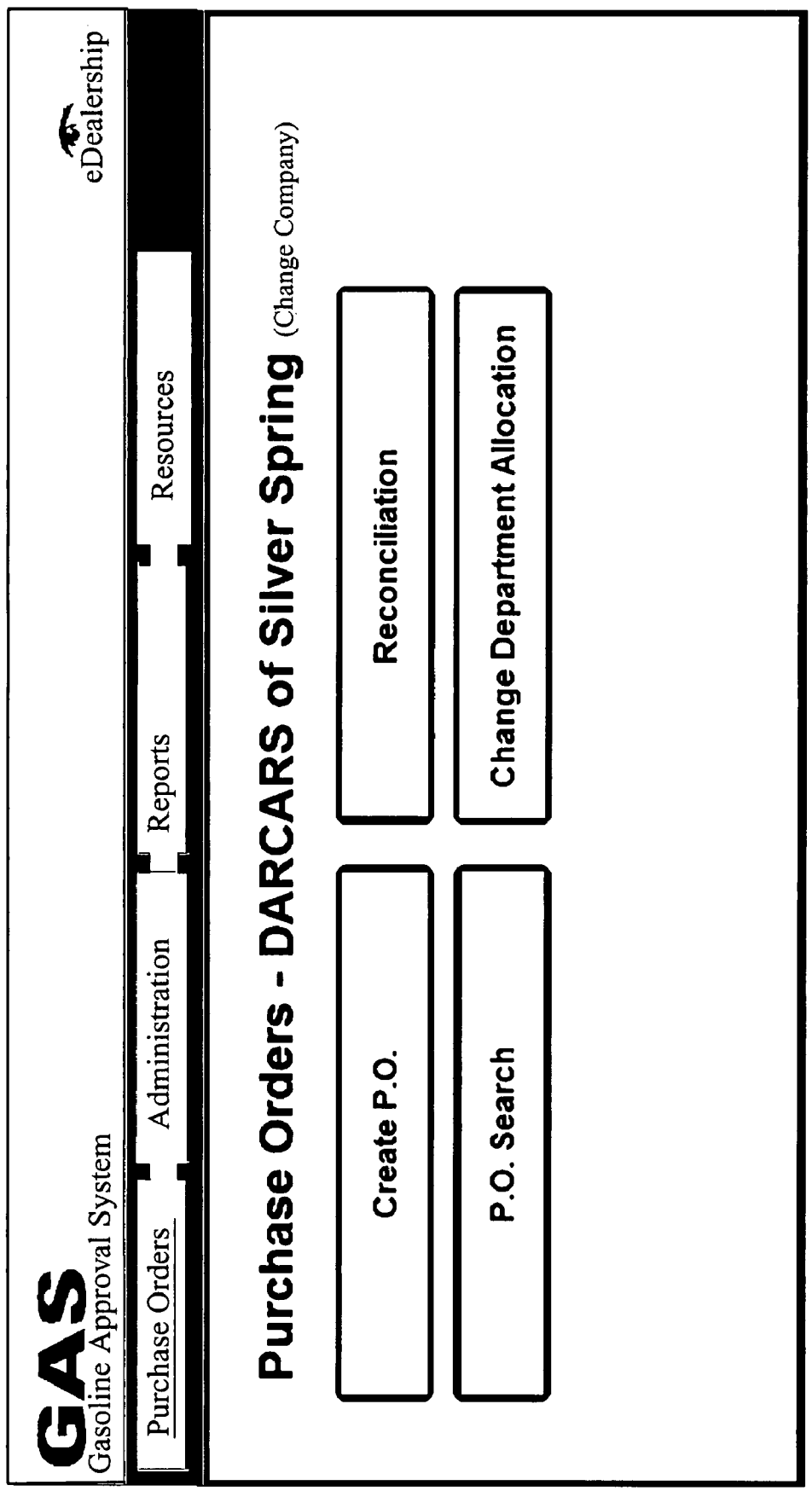
FIG. 6 is a screen print of the Purchase Order Selection Screen.

This engenders a Purchase Order Selection Screen as shown in FIG. 6, which includes a selection menu of Purchase order options including: "Create P.O.", P.O. Search", "Reconciliation" and "Change Dept. Allocation." At step 9 the overseer selects the Create P.O. tab at the top left of the screen.

Figure 7:
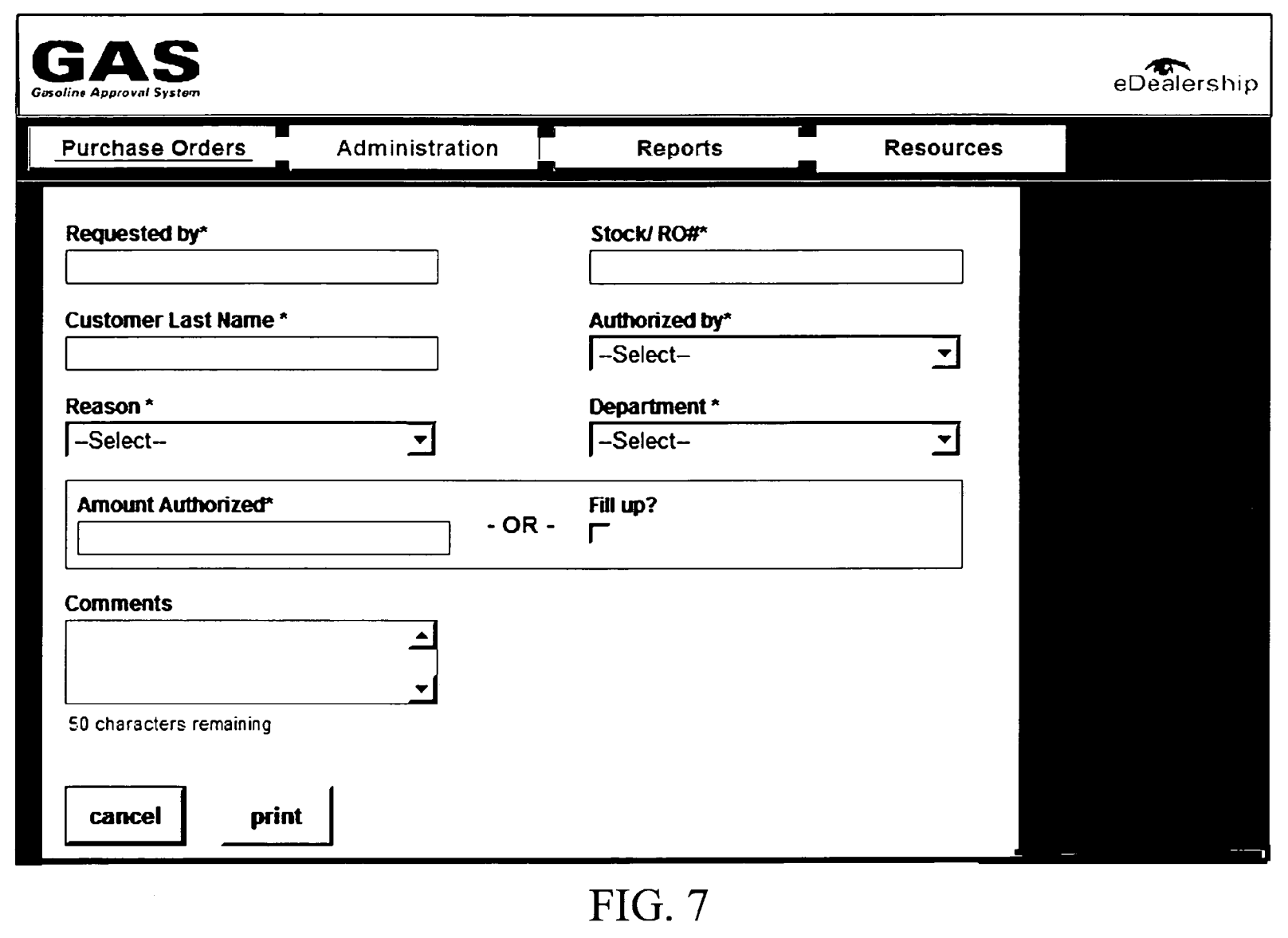

This calls a Purchase Order data entry screen. FIG. 7 is a screen print of the Purchase Order data entry screen which includes a combination of fields and drop-down lists which allows the overseer to enter the data from the Requestor's Gas Voucher Request Form and in return issue an authorized Gas Purchase Order to the requestor. The solicited information generally comprises an electronic purchase order form for completion, which includes much the same information as the Gas Voucher Request Form shown in FIG. 3.

At step 16 the overseer can easily obtain and enter the foregoing information from the Gas Voucher Request Form of FIG. 3, from which the overseer transcribes this information into the Purchase Order data entry screen of FIG. 7, including: Requested By, Customer Last Name, Reason, Stock #/RO #, Amount Authorized (or a check box for "fill up"), Department, Authorized By, and Comments. If the Purchase Order is associated with a dealership customer this is entered into "Customer Last Name", and the overseer must add the Reason for the gas from a pre-populated list of reasons such as test drive, new car sold, rental car fill up, etc. Stock #/RO # is completed with the dealer number of the automobile needing gas, or repair order # if it is for a vehicle in the service department, and the Department that prompted the need is also included. The Department is also from a pre-populated dropdown list. Note that different dealerships and other organizations may use designations other than Stock#/RO#, and consequently these labels are for illustrative purposes only. "Requested By" is the requestor. The Amount indicates the amount of gas requested. The overseer can input any amount, or click the check box to "Fill-Up" indicating a fill-up. In addition, the overseer may fill in any relevant Notes (general comments) for the benefit of the approving manager (see below). Finally, an "Authorized By" line appears. This line is akin to the manual manager's signature on the Gas Purchase Order Request Form. However, it is an optional control intended more for larger dealerships and fleet businesses, and may be too cumbersome and unnecessary for smaller dealerships. Consequently, the "Authorized By" feature is optional on a site-by-site basis. Any user can elect not to require a signature on the "Gas Purchase Order Request Form" (FIG. 3), in which case the dealership using the software will not see the "Authorized By" field in the "Create Gas Purchase Order" screen.

As part of step 16 the overseer will complete the empty gas purchase order form and hit Print, which prints two hard copies of the completed gas Purchase Order. This prints a single-page printout bearing two labeled hard copies of the completed gas Purchase Order, a Requestor Copy 17 and Control Copy 18.

FIG. 8 is a screen print of an exemplary Purchase Order printout including the Requestor Copy 17 (top) and Control Copy 18 (bottom) still attached. Note that the printout includes a few fields not typed in into the Purchase Order data entry screen of FIG. 7. The overseer's name is printed based on the current user's User ID and Login ID to identify who created the Purchase Order. In addition, both the Requestor Copy 17 and Control Copy 18 are earmarked with a unique auto-assigned Gas P.O. Number (upper left). This number is auto-assigned by the software in sequence, albeit the sequence ranges can be controlled by an administrator as will be described. The Date and Time printed are also auto-appended and printed toward the bottom. This data is stored with the other purchase order data. In addition, whenever a Purchase Order is printed for a given vehicle, a Recent PO History box 19 will also print on the Purchase Order for that particular vehicle STOCK #/RO#: (the dealer number of the vehicle). The PO History box 19 presently includes any PO history within the past 6 months plus the most recent 4 PO's (if available). The results are sorted in chronoligical order, oldest to newest. The fields presently included in the PO History box 19 are Date, PO Number, Auth Amount, Gallons, and Total. If there is no history to report from the last six months, the field headings will still print but a line will print in the detail section of this new area that says "NO HISTORY EXISTS FOR THIS VEHICLE"

At steps 17 and 18 the Requestor Copy 17 and Control Copy 18 are separated from each other. The Requestor Copy 17 is handed back to the requestor.

At step 19 the Control Copy 18 is simply filed by the overseer pending closure, preferably in numerical order of auto-assigned Purchase Order Number.

At step 20 the requestor must then obtain an authorized signature on the Requestor Copy. At this step the manual signature on the Requestor Copy is mandatory: this is what makes the printed Purchase Order valid for payment. It is recommended that each gas station used by the dealership be given a list of authorized signatures to allow them to match the authorized signature on the Requestor Copy to the list. This measure prevents fraudulent tickets from being printed by the Overseer.

This authorized Gas Purchase Order, with a manager's signed authorization, represents a valid offer to purchase gas, suitable for a gas station to accept. The "Authorized By" signature line is important so the gas station knows that the Requestor Copy of the Purchase Order is legitimate and that they will get paid for the gas. This also ensures that dealership management is aware of the gas Purchase Order being issued and has duly authorized the charge.

Of course proper implementation of the foregoing requires advance preparation at the gas station. It is necessary to inform the gas station that this is the only Purchase Order that will be accepted and paid by the dealership. It is also recommended that the dealership provide the gas station a list of authorized signatures that they can post at their cashier's station for easy verification of the management authorization signatures. It is also important to make policies clear that only the charges for authorized gasoline will be paid and not car washes, sundries, cigarettes, etc. Some of the most common fraudulent purchases include topping off one's personal car or adding sundries to the purchase. Authorized fuel grades (i.e. octane levels, diesel, etc.) should be established, and a reasonable expiration date for gas Purchase Orders may be put in place. The recommended policy is that gas Purchase Orders expire at the end of the day in which they are printed. In addition, the gas station must agree to provide the requester with a register receipt at every transaction that has the following information on it:

A. Gas Purchase Order PO Number (can be hand written at the top of receipt)

B. Gas station unique receipt number (to prevent duplication)

C. Number of gallons used in transaction

D. Price per gallon charged in transaction

E. Total amount charged in transaction.

The gas station should also be given the overseer's contact information so they can easily contact them with questions and/or fraud alerts. It is important to ensure that the gas station management is very clear on all of the foregoing policies, and that failure to adhere could result in non-payment and possibly even changing gas stations in the future.

Given the proper procedural guidelines at the gas station, at step 22 the requestor takes the Requestor Copy 17 and pumps gas at the station, using the Requestor Copy 17 Purchase Order in lieu of cash payment for the gas. The requestor exchanges his Requestor Copy 17 Purchase Order for the above-described receipt from the gas station (with the requisite particulars). The gas station preferably either charges monthly to a running account or to a credit card.

At step 24 the requestor returns the gas station receipt to the overseer, who then closes the Purchase Order. The Purchase Order is "Closed Out" to indicate fulfillment, and this is preferably accomplished by the overseer immediately, when each gas station receipt is returned by the requester. To do this the overseer retrieves the matching Control Copy 18 from the file. This is easy because the Control Copy 18 is filed in order of Purchase Order Number and the Requestor Copy bears that same auto-assigned number. Closing out may be accomplished by returning to step 4 and the Purchase Order Selection Screen as shown in FIG. 6, and by continuing to the "P.O. Search" selection as seen at step 10 (FIG. 2).

Figure 9:
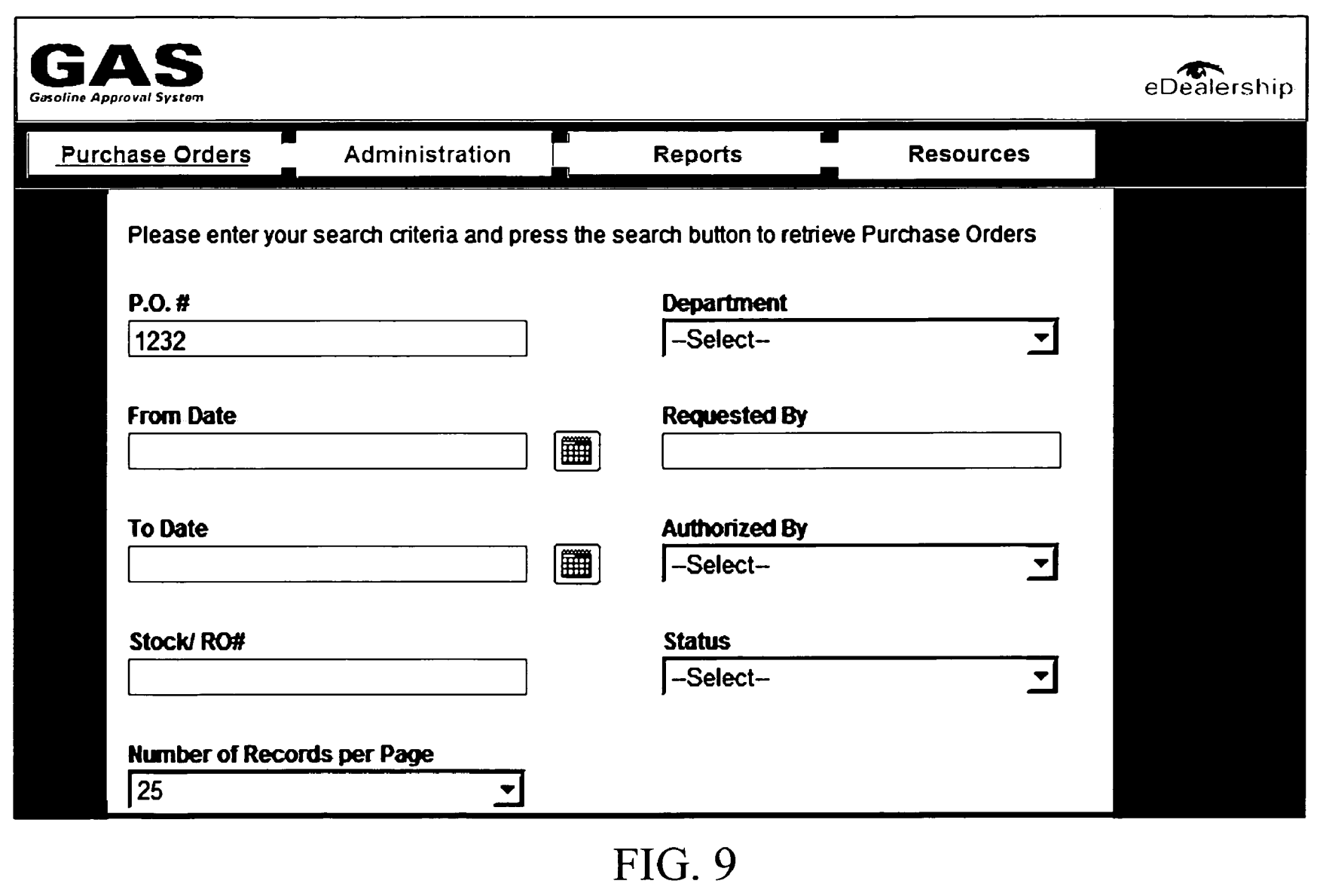

The P.O. Search selection of step 10 (FIG. 2) initiates a search screen as shown in FIG. 9.

The overseer is prompted to type in a particular Purchase Order Number, parameters of purchase orders (date range, etc.), or matching Gas Station Receipt No., and this will search the database of Purchase Orders for those of matching criteria. The results are displayed in a Purchase Order Display Screen as shown in FIG. 10, inclusive of all the relevant information for each retrieved Purchase Order.

Three buttons at bottom left include "Close", "Edit" and "Void", the latter two being fairly self-explanatory as the overseer may choose to void or edit any given Purchase Order. The need for gas Purchase Orders often becomes moot. For example, customers may call to cancel a test drive, pending deals may fall through, or parts orders may be canceled. Whenever any Purchase Orders must be voided the overseer will use the Void link, which brings up a Purchase Order Void form enabling entry of the void information, inclusive of who initiated the void (PO Voided By), and why (Reason for Void). This information is completed and stored in the database, and the Purchase Order is earmarked as "Voided." It is recommended that the Requestor Copy be returned to the overseer before being voided.

If a user wishes to edit a Purchase Order this is done through the edit link. This link display all data for a given PO and allows editing. In addition, it provides the ability to do a "Post With Adjustment". There are times when a Purchase Order gets closed out correctly but for one reason or another the dealership is paying a different amount than what it was originally closed out for. For example, a Purchase Order gets issued for $15.00 on March 14th. The PO get used on March 16th and closed out in the system for $15.00. The dealership policy is that POs expire on the day they are issued. Because of this, the dealership may not want to pay for this ticket, but it has already been closed out for $15.00. Now the user can "Post with Adjustment", meaning that they can bypass the reconciliation screen for this PO and enter $0.00 as the posted amount, plus a reason like "Gas station accepted ticket after expiration". This will then consider $0.00 as the posted amount and $0.00 will be used in all reports from here forward as the amount for that Purchase Order. This amount and its comments will also print on the Reconciliation Reports (described below).

Depressing the "Close" button allows the overseer to close the displayed Purchase Order, signifying that the requestor has filled the gas and submitted his gas station receipt. This action calls a Purchase Order Closeout data entry screen as shown in FIG. 11, which is an electronic form prepopulated with the information gathered when the Purchase Order was opened, and soliciting a bit more information. Specifically, as seen in FIG. 11, the additional information (at bottom) includes fields for Gas Station Receipt #, Number of gallons used, Price Per Gallon Charge, Total Charge, and PO Closing Notes (basically, all the information that the gas station is taught to include on the submitted receipt). The Overseer simply enters this information from the gas station receipt in order to close out that particular gas Purchase Order. Note that if the Number of gallons used times Price Per Gallon fails to equal Total Charge, the Purchase Order cannot be closed by the overseer. This signals misuse and an administrator is needed for intervention. Assuming the Purchase Order balances it is closed and cannot thereafter be edited except by administrator intervention. This information is completed and stored in the database, and the purchase order is earmarked as "Closed."

Although Purchase Orders may be entered and closed in real time, the database must be reconciled periodically as shown at step 28 (FIG. 2). The gas station will typically keep the collected Requestor Copies 17 and then return them in batches to the dealership on a periodic basis (e.g., monthly) as submission for payment, and this is an appropriate time for periodic reconciliation.

Referring back to FIG. 6, the Reconciliation Button provides a link to Reconcile as at step 28. Reconciliation is the periodic process of reconciling batch Purchase Orders 17 (returned by the gas station) with the earlier-filed Control Copies 18. Any manager with administrator rights can reconcile Purchase Orders, preferably on a monthly basis although any reconciliation interval may be selected. For example, reconciliation is convenient on a monthly basis when the gas station returns its' collected Purchase Orders in batch, or when the credit account charge statements arrive. Depressing the Reconciliation Button of FIG. 6 initiates a query and display of all Purchase Orders that have already been closed (submitted) but not yet reconciled.

Figure 13:
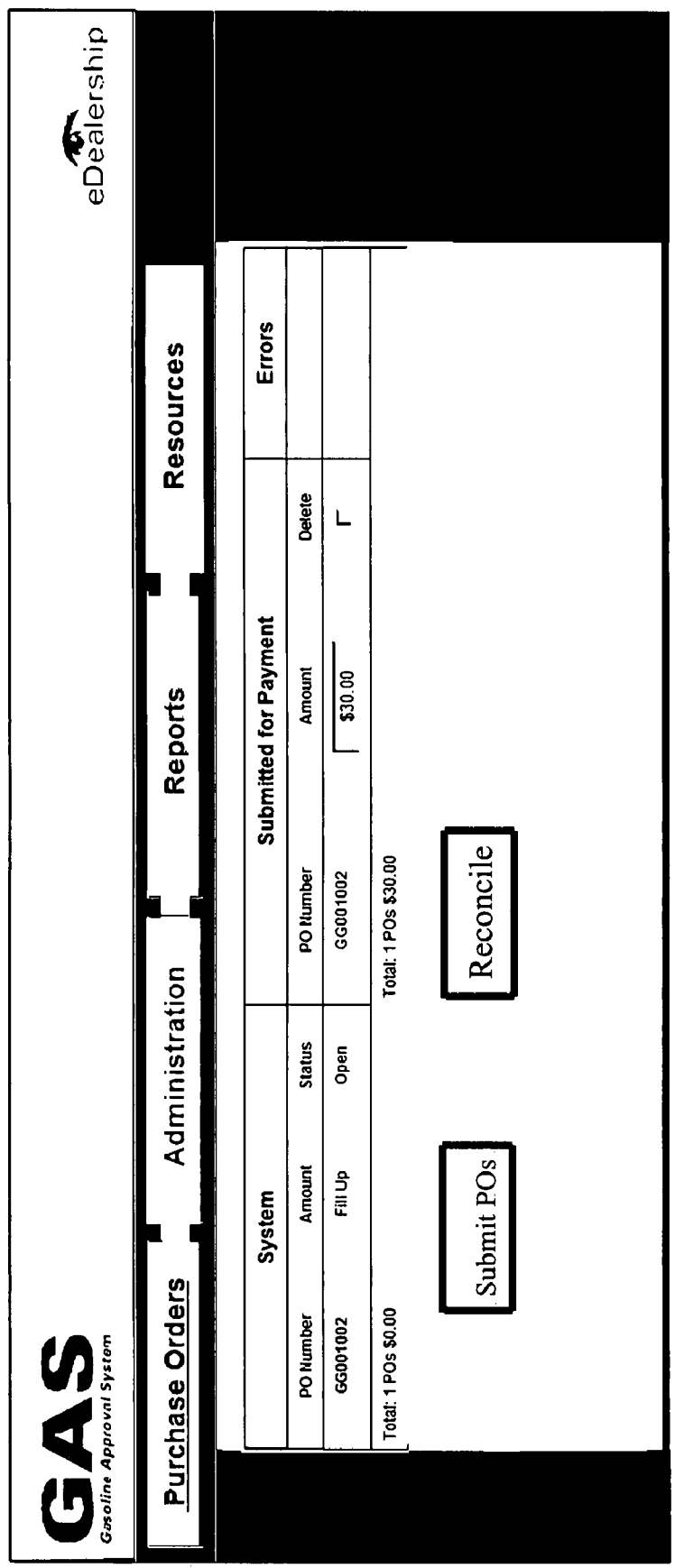
FIG. 13 is a screen print of an exemplary Purchase Order reconciliation screen.

FIG. 13 is a screen print of an exemplary Purchase Order reconciliation screen. Here all submitted but unreconciled Purchase Orders are displayed in list form. The Purchase Order reconciliation screen (FIG. 13) includes the Purchase Order No. and Amount as entered into the system when the Purchase Order was created if in "Open" or "Void" status or closed if in "Closed" or "Posted" status, plus the current Status (open, closed, voided, or posted) of that PO. At far right any non-equivalencies between the two that would prevent reconciliation is flagged. The System Status is shown at left including PO Number, Amount and Status. The Reconciliation info is shown at right including PO Number, Amount, and Delete. Each Purchase Order 17 returned by the gas station(s) and which has been submitted for reconciliation can be reconciled by depressing the "Reconcile" button at bottom. Alternately, the "Submit POs" button is a batch reconciliation button that allows the entry of up to fifty (50) different Purchase Order Numbers and Amounts on a single screen. Presuming that the manager has a new batch to submit, each Purchase Order 17 returned by the gas station(s) is submitted for reconciliation by depressing the Submit button. This creates a simple dialog by which the manager can enter the Purchase Order Number and Amount of the PO submitted, and save the submission.

As opposed to matching paper gas receipts to paper Purchase Orders, the reconciliation feature allows a manager to easily reconcile returned Purchase Orders or any charge statement received from the gas station (or credit card issuer) to the collective gas Purchase Orders executed during the timeframe of the charge statement.

Note that when a posted PO amount is greater than the authorized amount, a Soft Error message is displayed "Posted Amount will exceed Authorized Amount." With soft errors, Purchase Orders may still be reconciled even though the amounts do not match. In this case the User has three options:

1. Delete the entry.
2. Change the amounts so that the posted amount equals the authorized amount.
3. Reconcile the purchase order even though the amounts do not match.

This ensures that all discrepancies become immediately apparent, and errors can be distinguished from any unsavory trends in Purchase Order usage.

Such periodic reconciliations will also ensure that the charges billed were indeed charges incurred, and not gas station theft or error. This will also be beneficial to the user in that there will be accuracy on expense allocation between departments. Once a purchase order is reconciled, this information is completed and stored in the database, and the purchase order is earmarked as "Posted."

Referring back to FIG. 6, the Change Department Allocation Button provides a link for mass editing of Purchase Orders change their department allocation. This may occur, for example, if a salesman was misallocating their department on submitted Purchase Vouchers. By depressing the Change Department Allocation Button of FIG. 6 the overseer initiates a configurable query and displays all Purchase Orders that fit the query.

FIG. 14 is a screen print of an exemplary Change Department Allocation screen. Here three earlier-submitted Purchase Orders are displayed, and the department allocation can be easily reallocated by selecting from the drop-down box.

Dealership users (with or without administrative rights) are given no access to other dealer data or to any global administrative functions. However, ASP users are. The ASP users (Corporate Admins and Area Admins) are given more expansive access. Specifically, referring back to the Main Selection Screen of FIG. 4, a tabbed link is also provided for ASP Administration (this tab will not appear for dealerships). At step 5 (FIG. 2) this engenders an Administration Screen, as shown in FIG. 15, with selections for System Administration (Corporations, Areas, Companies, Users) as well as Company Administration (here G1440 Motors).

Figure 15:
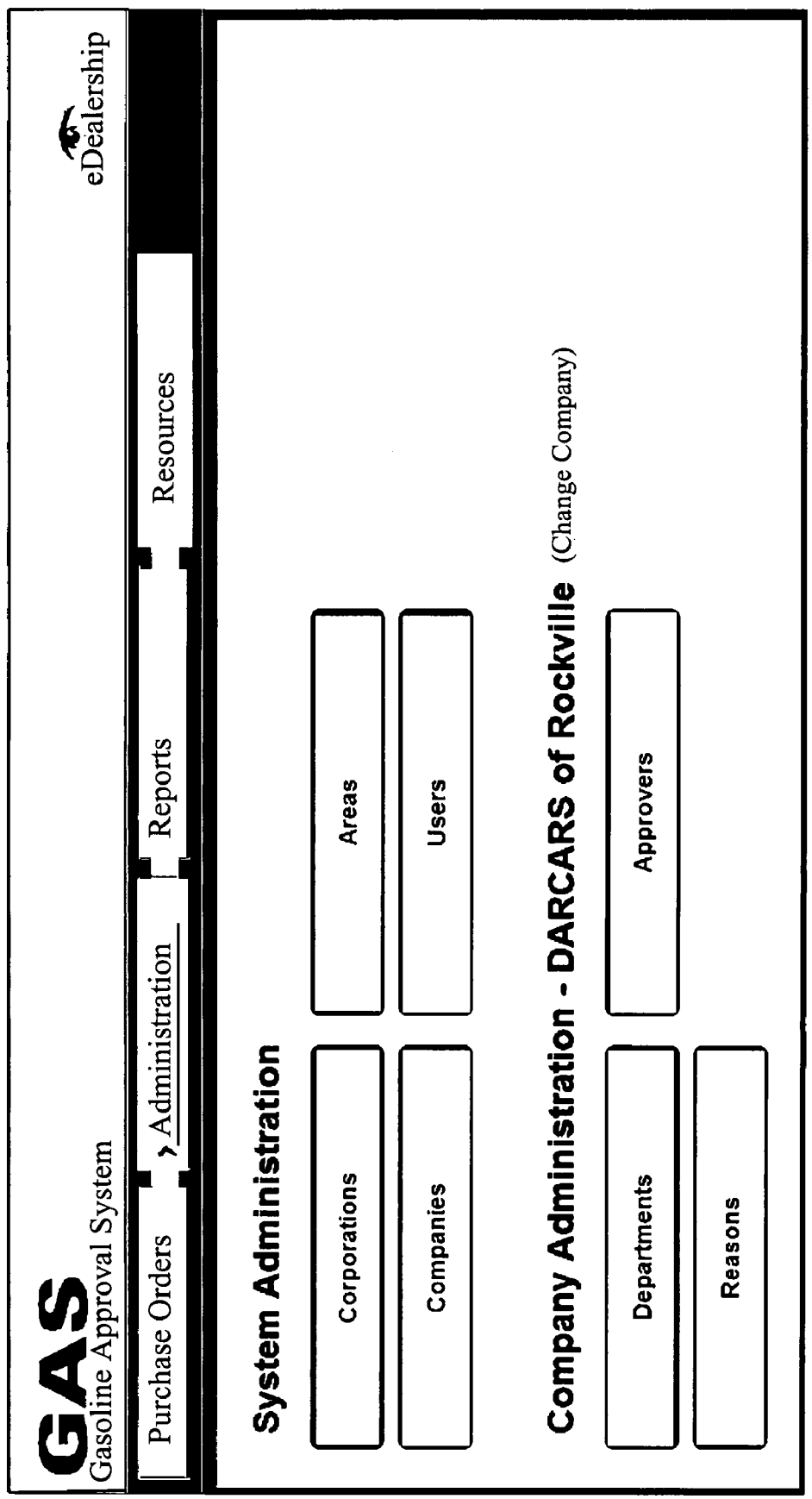
FIG. 15 is a screen print of the Administration Screen.

The Corporations link of FIG. 15 allows editing of the corporation information for each company listed in FIG. 5. Depressing this link displays all the corporation records and allows editing of corporation name, phone number, status, etc., as well as addition of new corporations. Again, this feature is accessible only by the application service provider maintaining the website.

The Company link of FIG. 15 allows editing of the company information for each of the multiple companies (or dealerships) that are a part of a given corporation as listed in FIG. 5. Depressing this link displays all the company information and allows editing of company name, phone number, status, etc., as well as addition of new companies. It is also possible to add areas within a company as described below (geographic).

The Area link of FIG. 15 allows editing of the area information for each of the multiple geographic areas that are a part of a given company as listed in FIG. 5. Depressing this link displays all the area information and allows addition of new areas. In view of the foregoing it should be clear that a given corporation (such as G1440) may comprise multiple companies (dealerships), and each dealership may have multiple geographic areas or locations. This structure is best able to accommodate a full range of dealerships from very small to very large. This link also provides the ability to select the proper time zone(s) in which a company is doing business, and also whether or not that company is effected by Daylight Savings Time (DST).

There is also a User link of FIG. 15, which allows assignment of user privileges/rights based on login status. For present purposes there are five defined User Roles assigned, each having a predefined set of user privileges/rights. The user rights are described in more detail below with regard to FIG. 20. The predefined users currently are: System Administrator, Corporate Administrator, Area Administrator, Company Administrator, and general User. Depressing the User link of FIG. 15 allows selection of a predefined Corporation, Company and one of the User Roles. This initiates a query that recalls all of the users that fit that profile, and their assignments can be edited or new users can be added as desired. This allows assignment each authorized user to be given a predefined set of user privileges.

The Company Administration area of FIG. 15 allows editing of specific company information, for example, the name "Darcars of Rockville" and other information.

The Departments link of FIG. 15 allows editing of the departmental information for each of the multiple companies (Sales, Service, etc.). Depressing this link displays all the area information and allows editing as well as addition of new areas.

The Approvers link of FIG. 15 allows editing/addition of Users who have management approval authority over Gas Purchase Vouchers. Depressing this link displays all current Approvers and allows editing of their information as well as addition of new Approvers. The Approvers pre-populate the "Authorized By" drop down list of FIG. 7.

The Reasons link of FIG. 15 allows editing/addition of the various reasons for purchasing gas. Depressing this link displays all current reasons (Company Vehicle, Customer Satisfaction, Demo Ride, Rental Car Fill-Up, Service, Sold Car—Delivery, Transport Vehicle, etc.) and allows editing of the information as well as addition of new Reasons. The Reasons pre-populate the namesake drop down list of FIG. 7.

FIG. 15 as described above is only accessible to ASP Administrators via the tabbed link on Main Selection Screen of FIG. 4, which tab does not appear for regular dealership employees.

Perhaps the most robust feature of the present software is the reporting capability gained through the Reports link of the Main Selection Screen of FIG. 4. Selecting this link as at step 6 of FIG. 2 engenders the Report Selection screen of FIG. 16, which provides an array of Reports categorized generally at step 32 as Unclosed Gas PO (Purchase Orders), End Of Month, Department, Voided PO, Stock Number and Export. The Unclosed Gas PO choice leads to a submenu of options as follows:

Unclosed Purchase Orders
 a. Unclosed Purchase Orders—By Issuer
 b. Unclosed Purchase Orders—By Department
 c. Unclosed Purchase Orders—All The Unclosed Purchase Order reports generally list any unclosed vouchers that have not yet been matched to gas receipts and closed out by the overseer as described above. Depending on the selection they can be sorted and grouped by the Issuing authority, Department, or not (All). Selecting the "By Issuer" option engenders a drop down list of defined users including System Administration (Corporations, Areas, Companies, Users) as well as Company Administration (here G1440 Motors) as explained above.

FIG. 17 is a screen print of an exemplary Unclosed Purchase Order Report>>By Issuer>>by g1440 Company Admin. The pertinent fields are labeled across the top. The strength of this and other Unclosed Purchase Order Reports is that all unclosed (and hence outstanding and presumably unfulfilled) Purchase Orders can be tracked and followed up on. This avoids instances of reuse of Purchase Order originally cut for one purpose when that purpose became moot. For example, if a customer fails to show up for a test drive the salesperson cannot then take the gas Purchase Order and use it for his personal car months later.

Figure 16:
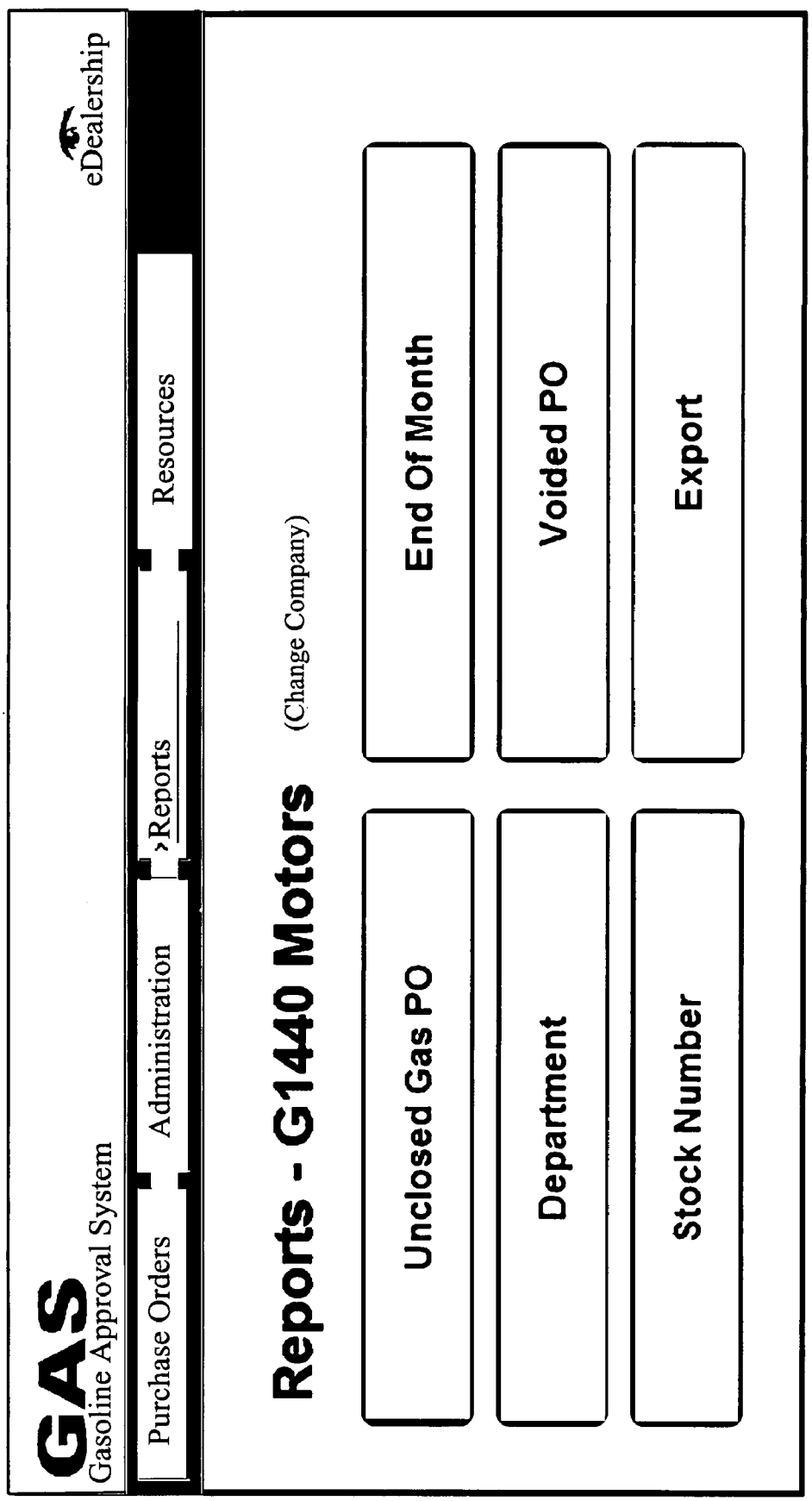
FIG. 16 is a screen print of the Report Selection Screen.

Referring back to the Report selection screen of FIG. 16, the Department Summary Report link initiates a brief dialogue that prompts the user for a start date, and end date for the report, and for any or all of the defined departments (Sales, Service, etc.). Once entered, this initiates a query to the database which populates a report listing all gas Purchase Orders over that timeframe for the specified (or all) each dealer department(s) grouped and totaled there for, whether unclosed or closed. Subtotals are added for all numeric data columns, e.g., by department, by reason, within department, and grand totals.

FIG. 18 is a screen print of an exemplary Department Summary Report >>Sales (for the sales Department). The pertinent fields are labeled across the top. The strength of this and other Department Summary Report is that gas expenditures can now be monitored by department to ensure some modicum of frugality (or excessive gas expenditures) on a departmental level.

Referring back to the Report selection screen of FIG. 16, the Stock Number link initiates a brief dialogue that prompts the user for selection of a Frequency Summary, Frequency Details, or History Audit. The Frequency Summary link initiates a brief dialogue that prompts the user for a start date, and end date for the report, and for a frequency number (minimum). Once entered, this initiates a query to the database which populates a report listing all gas Purchase Orders corresponding to particular dealer-assigned vehicle stock number over that timeframe, where at least the minimum specified frequency of PO's was posted to each stock number. The report is grouped and totaled by stock number, whether unclosed or closed. Thus, for dealer Stock # with the Number of POs set to minimum=1, stock number AGF87HG9H8G9NH8VG would be shown with a tally of 1 PO. This helps ferret out particular vehicles for which excessive gas purchase are being made.

The Stock Number >>Frequency Details link prints a more detailed frequency report that also includes PO#, PO Issued By, Stock#, Department Name, Auth Manager, Reason For Gasoline, Gallons, Voided By, Receipt, Requested By, Customer Name, Po Date/Time, Status, Cost Per Gallon, Number, Total Amount, And Any Voided Notes.

The Stock Number >>History Audit link allows entry of a specific dealer stock number and then prints a detailed frequency report containing the same information as the Frequency Audit but for that specified stock number.

Preferably, each Stock Number >>(report) selection is also equipped with a radio button added to the selection criteria, which enables the user to select whether or not VOIDED PO's should be included in the report.

Referring back to the Report selection screen of FIG. 16, the End of Month (Expenses) Reports generally list all end-of-month expenses. Selecting this link gives a submenu of options for summarizing the end of month expenses sorted By Reason, By Manager Detail, By Name, by Expense Detail, By Date or by PO number. Depending on the selection the expense report is summarized accordingly. End of month (EOM) reports can give either a high-level overview or complete Purchase Order detail to show respective department managers the details of their expenses.

FIG. 19 is a screen print of an exemplary End of Month Expense Summary Report for G1440 Motors, sorted by Date from Jan. 1, 2007 Thru Mar. 19, 2007. The report lists the Departments (here Sales) and their Total gas expenditures in those dates, the Percent relative to total dealership expenses, and the number of Purchase Orders closed (3 Gas PO's). The report note that there are 5 open Purchase Orders not included for this time period, and of the 3 closed PO's in this report, any that did not get posted (and their total value). The other End of Month (Expenses) Reports likewise list the end-of-month expenses accordingly but categorized and sorted as the user desires. This is an extremely telling report in that it allows viewing of the various departments as cost centers, and allows a general manager to fix excessive spending in any given department. This was previously impossible using the older paper system.

Note that the "Posted Purchase Order" report under End Of Month is for reconciliation. Once Purchase Orders are reconciled, the user can run this report based on Reconciled dates. A simple dialogue appears prompting the user for a range of "FROM DATE" and "TO DATE". Given a date selection this report provides a summary of all Purchase Orders reconciled and posted. This particular report can be returned directly to the gas station with payment since it lists the Purchase Orders that they will be paid for. The Post With Adjustment comments also print on this report.

The Print Voided PO Report link initiates a brief dialogue that prompts the user for a start date, and end date for the report. Once entered, this initiates a query to the database which populates a report listing all voided Purchase Orders. This report can help if the gas station requests payment on a Gas Purchase Order that has been voided. Again, this report helps to spot fraudulent trends in the store or the gas station.

Finally, referring back to FIG. 16 the software provides an Export link that allows exportation of selected data in CSV format for spreadsheets such as Microsoft Excel™. These specifically include a "Voided PO list", an "All Except Voided PO" list, and "Only Posted POs" list. In addition, each of the foregoing selections preferably includes a "Gas PO by Date Range" filter added to all export report selections. The export button will then export the corresponding list to a file in comma separated (or similar export) format for Excel™ or other spreadsheet. All other reports can be transferred to CSV format in their original report format from the report preview screen.

Finally, referring back to the Main Selection Screen of FIG. 4, a user has a variety of help resources at hand. These include Setup Procedures, which displays a treatise of proper dealership setup procedures inclusive of training of employees and of the gas stations they employ, Frequently-asked question answers, and Printer Control. In addition, a Request Form link is presented that prints a blank Gas Purchase Order Voucher. As stated above, Dealerships may choose to require management authorization on Gas Purchase Order Vouchers or not. Dealerships that choose this feature and select the Request Form link are presented with a blank Gas Purchase Order Voucher as shown in FIG. 3 (with "Authorized By" line). Dealerships that do not choose this feature are presented with a blank Gas Purchase Order Voucher similar to FIG. 3 but with no "Authorized By" line. This way, users can only access the Gas Purchase Order Voucher form that pertains to their company.

In addition, for all dealership users with administrative rights, the Resources link provides a "GAStrocities" sub-selection that displays a series of press-release style articles on instances of fraud flagged by the above-described system. For example, "Gas Station Clerk Caught Stealing. Dealership personnel go the gas station with an open "fill-up" ticket for new car deliveries. We caught the gas station clerk adding money to these "fill-up" tickets after our employee would leave the station. He then would take the amount added to the ticket from the cash drawer for his own pocket charging this "new" amount to our account. Who knows how long this was going on before we signed up? The system not only stopped this fraudulent activity, but it greatly reduced our monthly gas expenditures." In addition to displaying pre-published a "GAStrocities", this sub-selection also provides an online submission form whereby subscribers can post their own "GAStrocities" and, if selected, have them displayed as well. This section obviously has a heavy marketing purpose and has been found to excel in highlighting the need for the above-described system to potential subscribers.

While not illustrated, the Resources link also includes an Online Help sub-selection which is only accessible to dealership users with administrative rights. This links to an online Adobe™ PDF users manual.

As mentioned above user permissions are allocated for each of the pre-defined user types including System Administrators, Corporate Administrators, Area Administrators, Company Administrators, and general Users. FIG. 20 is a matrix of the default-assigned permissions (and corresponding editing/reporting capabilities allowed for each of these user groups, although these permissions are freely editable by subscribers with authority.

The above-described web-based software may be implemented in a traditional application service provider (ASP) framework on a conventional web-enabled computer server with standard supporting software. While more or less powerful computer systems can be used, it is suggested that the computer system employ one or more back-end web-enabled server(s), database and website all maintained by a the ASP, and all subscriber-Manager communication may take place over the Internet. The back-end Manager server(s) may run on a web-enabled Microsoft platform, such as Windows 2000 Advanced Server edition hosting a conventional database application such as MS SQL Server 2000, though these are exemplary components only and other web-enabled platform will suffice. Data extracted from the website (to be described) populates the SQL (or other suitable) database with the object information. This architecture is fully scalable to meet growing demand.

Subscribers gain access by conventional PC's equipped with a conventional color monitor, a modem or broadband connection, and standard input devices including mouse and keyboard. The operating system may be Windows XP or equivalents, and a conventional browser such as Windows Internet Explorer™ is required.

One skilled in the art will understand that that the software may alternatively be shrink-wrapped and capable of running on a standalone PC, in which case the software may be compressed onto a series of installation floppy diskettes or CDROM, and may be loaded onto a computer system as described above using conventional installation macros such as provided with Windows XP.

It should now be apparent that the above-described process and supporting software provides a complete solution for automobile dealerships, rental car companies and fleet businesses to give them comprehensive gas book management capabilities, inclusive of authorizing and tracking gas book expenditures, as well as accounting, reconciling and reporting on them. The savings from reduced fraud and charge mistakes will greatly exceed the cost of the system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A method for automobile dealerships and fleet businesses to monitor as purchases to prevent fraud, mistake and excess gas expenditures by employees, gas stations and credit companies involved in transacting said gas purchases, comprising the steps of:

providing a web-enabled computer server having gas-purchase accounting, reconciling, and reporting software embodied on a computer-readable medium, and a computer database, all maintained by a third party application service provider;

providing a remote computer workstation at a client automobile dealership or fleet business in communication with said first web-enabled computer server;

requiring an employee seeking to purchase gas for a client-owned vehicle to complete a purchase request form specifying at least an identity of the employee seeking to purchase gas, a reason for purchasing gas, an amount of gas requested, and a vehicle identification for which said gas is to be purchased;

inputting data from completed purchase request form into said computer database using said software from said remote computer workstation;

auto-generating at said web-enabled computer server a unique Purchase Order number for each inputted purchase request form and appending said Purchase Order number to the inputted data along with a time-stamp comprising date and time of entry;

printing two copies of a Purchase Order both bearing the same unique auto-generated Purchase Order number, time stamp, and vehicle identification, said Purchase Order representing authorization for purchase of said amount of gas requested in exchange for payment;

filing the first copy of said Purchase Order;

giving the second copy of said Purchase Order to said employee seeking to purchase gas for submission as a binding offer to purchase gas at a gas station;

pumping said gas upon acceptance of the offer by said gas station;

exchanging said second copy of said Purchase Order with said gas station in return for a gas station receipt marked with the unique Purchase Order number of the Purchase Order;

returning the gas station receipt to the client automobile dealership or fleet business;

inputting data from said gas station receipt, including corresponding Purchase Order number and amount of gas pumped, into said computer database using said software from said computer workstation;

comparing for each unique Purchase Order number the inputted data from said gas station receipt with the corresponding inputted data from said purchase request form;

designating each Purchase Order as closed when said amount of gas requested equals the amount of gas pumped;

performing a periodic reconciliation of closed Purchase Orders that have not previously been reconciled and thereby detecting fraud, mistake and excess gas expenditures by said employees, gas stations and credit companies involved in transacting said gas purchase by querying and displaying closed unreconciled Purchase Orders in said computer database from said computer workstation, said periodic reconciliation further including a step of comparing said closed unreconciled Purchase Orders to gas station or credit company data and indicating non-equivalencies to detect fraud, mistake and excess gas expenditures, said comparing being performed by said software on said server.

2. The method for automobile dealerships and fleet businesses to monitor gas purchases to prevent fraud, mistake and excess gas expenditures according to claim 1, wherein the step of designating each Purchase Order as closed further comprises inputting a closed status into said computer database using said software from said computer workstation upon return of the corresponding gas station receipt when the Purchase Order amount of gas requested equals the amount of gas pumped per said receipt.

3. The method for automobile dealerships and fleet businesses to monitor gas purchases to prevent fraud, mistake and excess gas expenditures according to claim 1, further comprising the step of said gas station returning Purchase Orders to the dealership in batches, and the step of performing a periodic reconciliation of closed Purchase Orders further comprises comparing said closed unreconciled Purchase Orders in said computer database with the returned batch Purchase Orders from said gas station.

4. The method for automobile dealerships and fleet businesses to monitor gas purchases to prevent fraud, mistake and excess gas expenditures according to claim 1, wherein each Purchase Order includes date & time, customer's last name (if applicable), reason for getting gas, stock# of the vehicle, amount of gas needed (dollar amount or fill-up), department, person who authorized the request (if applicable) and comments.

5. The method for automobile dealerships and fleet businesses to monitor gas purchases to prevent fraud, mistake and excess gas expenditures according to claim 1, further comprising the step of assigning an employee to act as an overseer, and said overseer performs said step of inputting data from a Purchase Order request form into said computer database using said software from a computer workstation, and said overseer performs said step of inputting data from said gas station receipt into said computer database using said software from a computer workstation.

6. A computer system for allowing automobile dealerships and fleet businesses to monitor gas purchases to prevent fraud, mistake and excess gas expenditures by employees, gas stations and credit companies involved in transacting said gas purchases, comprising:

a web-enabled computer server maintained by a third party application service provider on behalf of its client that houses gas-purchase accounting, reconciling, and reporting software and a computer database, wherein said software comprises, a data entry module that allows an employee of a client to enter data from a completed Purchase Order request form, data from a returned gas station receipt, and data from Purchase Orders returned by gas stations;

a Purchase Order number module that automatically generates a unique Purchase Order number and appends said Purchase Order number along with date and time of entry and a user ID of said employee to the data entered into said web database;

a status module that allows an overseer to indicate within said database that a given Purchase Order is closed after fulfillment when an amount of gas authorized in said Purchase Order equals an amount of gas pumped;

an individual Purchase Order closure module that allows said overseer to compare inputted data from a completed Purchase Order request form with inputted data from a corresponding returned gas station receipt and to close individual Purchase Orders when said inputted data reconciless;

a batch Purchase Order reconciliation module that allows said overseer to perform a periodic reconciliation of closed Purchase Orders and thereby detect fraud, mistake and excess gas expenditures by said employees, gas stations and credit companies involved in transacting said gas purchase by querying and displaying closed Purchase Orders in said computer database from said computer workstation, comparing said closed unreconciled Purchase Orders to gas station or credit company data, and indicating non-equivalencies to detect fraud, mistake and excess gas expenditures;

a remote client computer workstation in communication with said web-enabled computer server through the internet for accessing said software and entering data into said database.

7. A method for automobile dealerships and fleet businesses to monitor gas purchases to prevent fraud, mistake and excess gas expenditures by employees, gas stations and credit companies involved in transacting said gas purchases, comprising:

a first step of providing a web-enabled computer server having software for accounting, reconciling, and reporting gas purchases and a computer database, and providing a purchaser computer workstation in communication with said first web-enabled computer server;

a second step of completing a Gas Purchase Order request form-with data indicating identity of requester, customer, a purpose for said gas purchase, a vehicle ID for which gas is being purchased, and an amount of gas to be purchased;

a third step of submitting said completed Gas Purchase Order request form to an overseer for entry of said data into said database from said remote computer workstation;

a fourth step of printing a requestor copy and a control copy of a Gas Purchase Order, both of said requester copy and control copy bearing the same automatically-generated Purchase Order number, said Purchase Order representing authorization for purchase of said amount of gas requested in exchange for payment;

a fifth step of manually filing the control copy of said Gas Purchase Order;

a sixth step of presenting said requestor copy to a gas station as an authorized offer to purchase gas;

a seventh step of pumping gas and exchanging said requestor copy for a gas station receipt bearing said Purchase Order number that corresponds to the exchanged requestor copy;

an eighth step of submitting said gas station receipt to an overseer for entry into said database using said software from said computer workstation;

a ninth step of reconciling each Purchase Order by comparing inputted data from said gas station receipt with the corresponding inputted data from said Gas Purchase Order request form entered in said database, and designating each Purchase Order closed when the inputted data from said gas station receipt concurs with the corresponding inputted data from said Gas Purchase Order request form;

a tenth step of performing a periodic reconciliation of closed Purchase Orders and thereby detecting fraud, mistake and excess gas expenditures by said employees, gas stations and credit companies involved in transacting said gas purchase by querying and displaying closed Purchase Orders in said computer database from said computer workstation, comparing said closed Purchase Orders to batch transaction data, and indicating non-equivalencies to detect fraud, mistake and excess gas expenditures to detect fraud, mistake and excess gas expenditures.

8. The method for automobile dealerships and fleet businesses to monitor gas purchases to prevent fraud, mistake and excess gas expenditures according to claim 7, wherein said gas station collects the requestor copies of Purchase Orders in batches until time to collect payment, and then periodically submits said collected requestor copies of Purchase Orders back to said automobile dealership or fleet business in batch for payment; and said tenth step of performing a periodic reconciliation further comprises comparing said collected batch requestor copies of Purchase Orders to detect fraud, mistake and excess gas expenditures.

9. The method for automobile dealerships and fleet businesses to monitor gas purchases to prevent fraud, mistake and excess gas expenditures according to claim 7, wherein said second step further comprises obtaining a manager's signature on said Gas Purchase Order request form.

10. The method for automobile dealerships and fleet businesses to monitor gas purchases to prevent fraud, mistake and excess gas expenditures according to claim 7, wherein the amount of gas needed may comprise a dollar amount or fill-up.

* * * * *